United States Patent
Wu et al.

(10) Patent No.: US 11,490,424 B2
(45) Date of Patent: Nov. 1, 2022

(54) PERFORMING MULTIPLE RANDOM ACCESS PROCEDURES

(71) Applicant: Motorola Mobility LLC, Chicago, IL (US)

(72) Inventors: Lianhai Wu, Beijing (CN); Prateek Basu Mallick, Dreieich (DE); Joachim Loehr, Wiesbaden (DE); Chenxi Zhu, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 248 days.

(21) Appl. No.: 16/623,267

(22) PCT Filed: Jun. 16, 2017

(86) PCT No.: PCT/CN2017/088746
§ 371 (c)(1),
(2) Date: Dec. 16, 2019

(87) PCT Pub. No.: WO2018/227598
PCT Pub. Date: Dec. 20, 2018

(65) Prior Publication Data
US 2020/0187260 A1     Jun. 11, 2020

(51) Int. Cl.
*H04W 74/08*     (2009.01)
*H04W 56/00*     (2009.01)

(52) U.S. Cl.
CPC ... *H04W 74/0833* (2013.01); *H04W 56/0005* (2013.01)

(58) Field of Classification Search
CPC ......... H04W 74/0833; H04W 56/0005; H04W 74/0866; H04W 60/005; H04W 74/0875; H04W 72/046
See application file for complete search history.

(56) References Cited

U.S. PATENT DOCUMENTS

| 9,900,891 B1* | 2/2018 | Islam ...................... H04B 7/088 |
| 2013/0064165 A1* | 3/2013 | Chen ................. H04W 56/0045 370/312 |

(Continued)

FOREIGN PATENT DOCUMENTS

| CN | 101646251 A | 2/2010 |
| CN | 101674661 A | 3/2010 |

(Continued)

OTHER PUBLICATIONS

62436966,Specification,Dec. 20, 2016 (Year: 2016).*
(Continued)

*Primary Examiner* — Chi H Pham
*Assistant Examiner* — Ji-Hae Yea
(74) *Attorney, Agent, or Firm* — Kunzler Bean & Adamson

(57) ABSTRACT

Apparatuses, methods, and systems are disclosed for performing multiple random access procedures. One apparatus (200) includes a processor (202) that: determines (402) that multiple random access procedures are triggered; and performs (404) the multiple random access procedures in parallel, selects a prioritized random access procedure of the multiple random access procedures to perform based on a priority corresponding to the multiple random access procedures, or some combination thereof.

14 Claims, 5 Drawing Sheets

(56) References Cited

U.S. PATENT DOCUMENTS

| | | | | |
|---|---|---|---|---|
| 2014/0161089 A1* | 6/2014 | Ahn | ............... | H04W 74/0833 |
| | | | | 370/329 |
| 2015/0271765 A1* | 9/2015 | Hakola | ............... | H04W 52/34 |
| | | | | 370/329 |
| 2017/0367120 A1* | 12/2017 | Murray | ............... | H04B 7/0695 |
| 2019/0104549 A1* | 4/2019 | Deng | ............... | H04W 52/365 |
| 2019/0208547 A1* | 7/2019 | Koskela | ............ | H04W 72/0446 |
| 2019/0261421 A1* | 8/2019 | Peisa | ............... | H04W 74/0833 |

FOREIGN PATENT DOCUMENTS

| | | |
|---|---|---|
| CN | 102984806 A | 3/2013 |
| CN | 105745849 A | 7/2016 |
| EP | 3048853 A1 | 1/2016 |

OTHER PUBLICATIONS

62323081,Specification,Apr. 15, 2016 (Year: 2016).*
62400813,Specification,Sep. 28, 2016 (Year: 2016).*
62443395,Specification,Jan. 6, 2017 (Year: 2017).*
62443395,Drawings-only_black_and_whitejine_drawings,Jan. 6, 2017 (Year: 2017).*
PCT/CN2017/088746, Notification of Transmittal of the International Search Report and the Written Opinion of the International Searching Authority, or the Declaration, dated Mar. 8, 2018, pp. 1-9.

* cited by examiner

PERFORMING MULTIPLE RANDOM ACCESS PROCEDURES

FIELD

The subject matter disclosed herein relates generally to wireless communications and more particularly relates to performing multiple random access procedures.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, multiple random access procedures may be triggered. In such configurations, there may not be a way to handle the multiple random access procedures.

BRIEF SUMMARY

Apparatuses for performing multiple random access procedures are disclosed. Methods and systems also perform the functions of the apparatus. In one embodiment, the apparatus includes a processor that: determines that multiple random access procedures are triggered; and performs the multiple random access procedures in parallel, selects a prioritized random access procedure of the multiple random access procedures to perform based on a priority corresponding to the multiple random access procedures, or some combination thereof.

In one embodiment, a random access procedure for a transition from an inactive state to a connected state has priority over a random access procedure for an on-demand system information request. In a further embodiment, a random access procedure for a beam recovery request has priority over a random access procedure for an uplink synchronization. In certain embodiments, the processor selects the prioritized random access procedure to perform based on a random access procedure for a transition from an inactive state to a connected state having priority over a random access procedure for an on-demand system information request, a random access procedure for a beam recovery request having priority over a random access procedure for an uplink synchronization, or some combination thereof. In various embodiments, the processor performs the prioritized random access procedure and stops unselected random access procedures from being performed while the prioritized random access procedure is being performed. In some embodiments, the apparatus includes a receiver that receives a random access response in a beam. In such embodiments, the random access response includes a backoff indicator.

In certain embodiments, the backoff indicator is applied to a random access procedure associated with the beam. In some embodiments, in response to performing the multiple random access procedures in parallel, the processor assigns a separate parameter set for each random access procedure of the multiple random access procedures. In various embodiments, in response to performing the multiple random access procedures in parallel, the processor performs the multiple random access procedures in parallel based on the separate parameter set for each random access procedure.

In one embodiment, the apparatus includes a receiver that receives a random access response corresponding to a first random access procedure. In such an embodiment, in response to a random access preamble identifier included in the random access response matching a transmitted random access preamble, the transmitter transmits a message including information corresponding to a second random access procedure. In certain embodiments, the apparatus includes a receiver that receives a random access response corresponding to a random access procedure. In such an embodiment, in response to receiving the random access response and in response to the random access procedure corresponding to a handover or reestablishment, the transmitter transmits a message including an on-demand system information request.

A method for performing multiple random access procedures, in one embodiment, includes determining that multiple random access procedures are triggered. In some embodiments, the method includes performing the multiple random access procedures in parallel, selecting a prioritized random access procedure of the multiple random access procedures to perform based on a priority corresponding to the multiple random access procedures, or some combination thereof.

In one embodiment, an apparatus for performing multiple random access procedures includes a receiver that receives multiple random access preambles corresponding respectively to multiple random access procedures in parallel, receives a prioritized random access preamble of the multiple random access preambles based on a priority corresponding to the multiple random access procedures, or some combination thereof.

In certain embodiments, a random access procedure for a transition from an inactive state to a connected state has priority over a random access procedure for an on-demand system information request. In various embodiments, a random access procedure for a beam recovery request has priority over a random access procedure for an uplink synchronization. In some embodiments, the prioritized random access preamble is selected based on a random access procedure for a transition from an inactive state to a connected state having priority over a random access procedure for an on-demand system information request, a random access procedure for a beam recovery request having priority over a random access procedure for an uplink synchronization, or some combination thereof.

In certain embodiments, the apparatus includes a transmitter that transmits a random access response corresponding to a first random access preamble. In some embodiments, in response to transmitting the random access response, the receiver receives a message including information corresponding to a second random access preamble. In various embodiments, the apparatus includes a transmitter that transmits a random access response corresponding to a random access preamble. In one embodiment, in response to transmitting the random access response and in response to the random access preamble corresponding to a handover or reestablishment, the receiver receives a message including an on-demand system information request.

A method for performing multiple random access procedures, in one embodiment, includes receiving multiple random access preambles corresponding respectively to multiple random access procedures in parallel, receiving a prioritized random access preamble of the multiple random access preambles based on a priority corresponding to the multiple random access procedures, or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
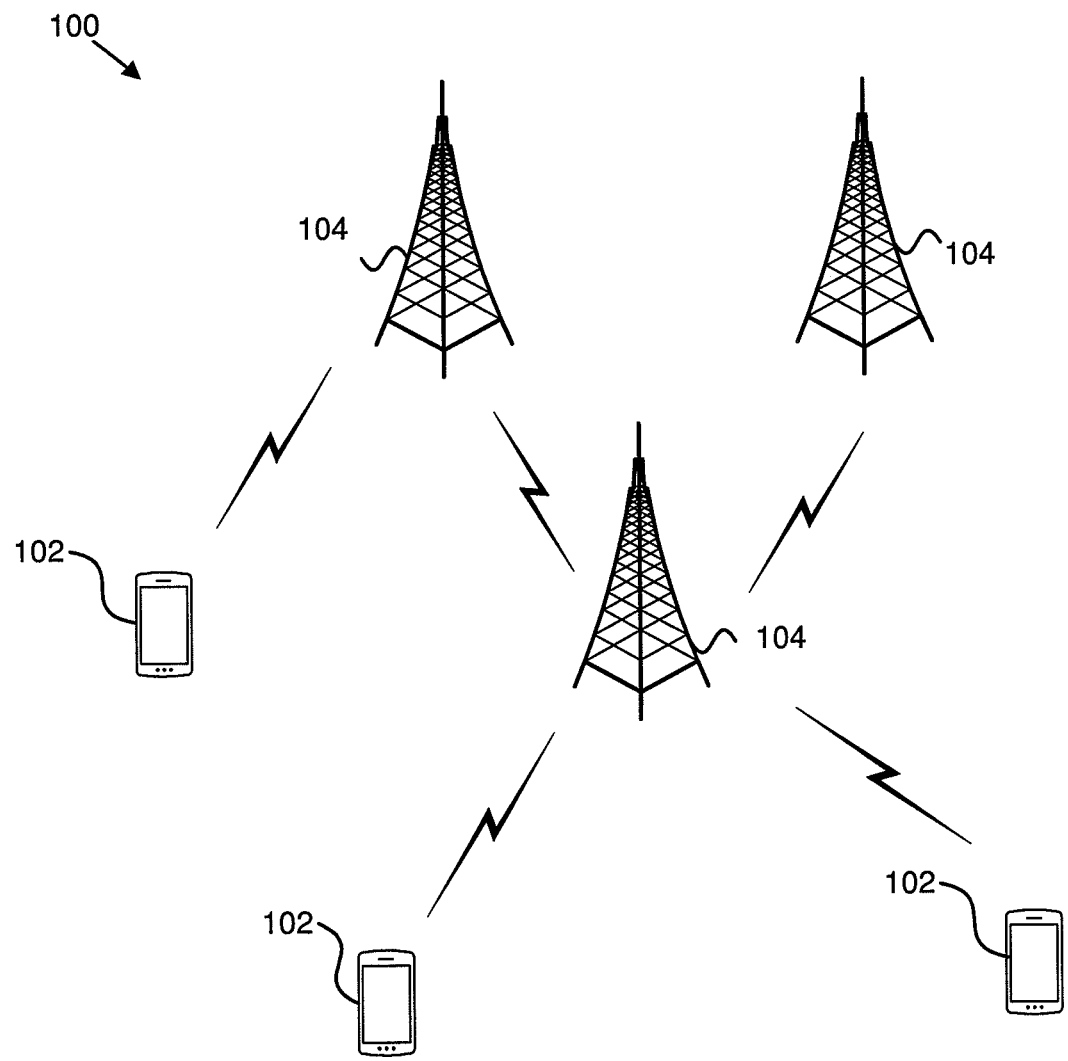
FIG. 1 is a schematic block diagram illustrating one embodiment of a wireless communication system for performing multiple random access procedures.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for performing multiple random access procedures. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may determine that multiple random access procedures are triggered. In some embodiments, the remote unit 102 may perform the multiple random access procedures in parallel (e.g., at the same time), select a prioritized random access procedure of the multiple random access procedures to perform based on a priority corresponding to the multiple random access procedures, or some combination thereof. Accordingly, a remote unit 102 may be used for performing multiple random access procedures.

In certain embodiments, a base unit 104 may receive multiple random access preambles corresponding respectively to multiple random access procedures in parallel, receive a prioritized random access preamble of the multiple random access preambles based on a priority corresponding to the multiple random access procedures, or some combination thereof. Accordingly, a base unit 104 may be used for performing multiple random access procedures.

Figure 2:
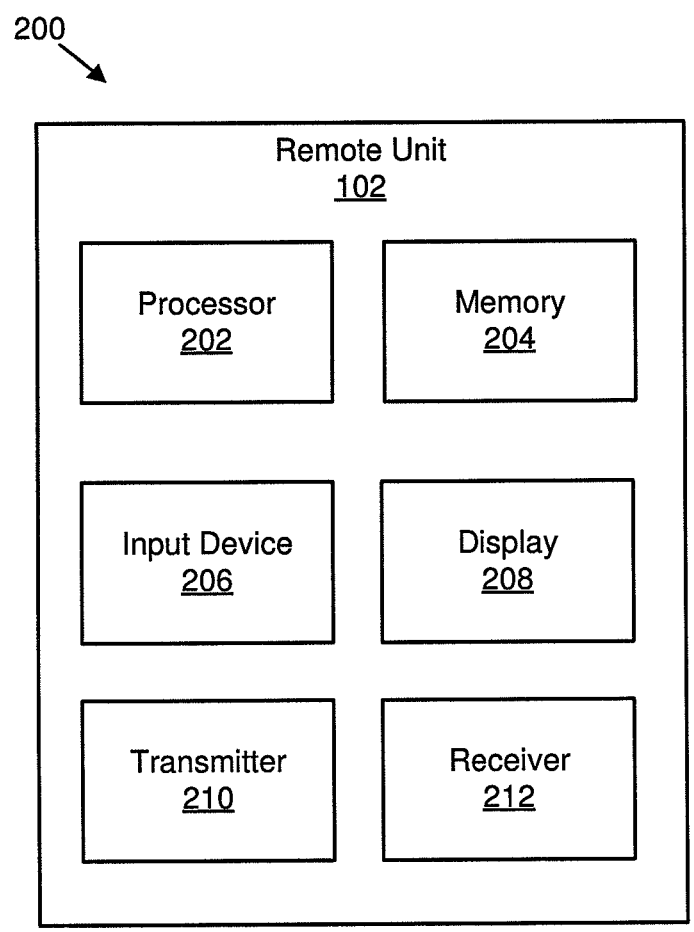
FIG. 2 is a schematic block diagram illustrating one embodiment of an apparatus that may be used for performing multiple random access procedures.

FIG. 2 depicts one embodiment of an apparatus 200 that may be used for performing multiple random access procedures. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may determine that multiple random access procedures are triggered. In some embodiments, the processor 202 may perform the multiple random access procedures in parallel and/or select a prioritized random access procedure of the multiple random access procedures to perform based on a priority corresponding to the multiple random access procedures. In some embodiments, the priority may be determined based on configuration from the base unit 104 and/or based on a specification. In one embodiment, the priority may include a ranking order of each random access procedure in which a higher ranking random access procedure has a higher priority. In some embodiments, random access procedures with a higher priority are performed before random access procedures with a lower priority. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to random access procedures. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
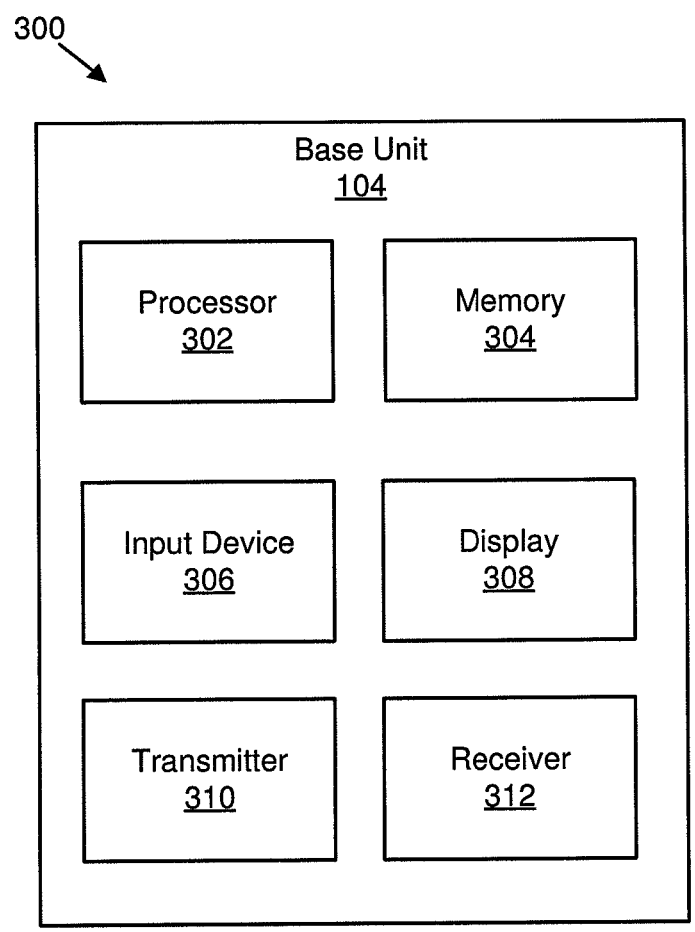
FIG. 3 is a schematic block diagram illustrating one embodiment of an apparatus that may be used for performing multiple random access procedures.

FIG. 3 depicts one embodiment of an apparatus 300 that may be used for performing multiple random access procedures. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the receiver 312 may be used to receive multiple random access preambles corresponding respectively to multiple random access procedures in parallel and/or receive a prioritized random access preamble of the multiple random access preambles based on a priority corresponding to the multiple random access procedures. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, performing multiple random access procedures may be performed by enabling only one random access procedure to performed at a time using various steps, such as the steps that follow, that may be performed in any suitable order and/or some steps may not be performed.

In a first step, a base unit 104 may transmit random access parameters to a remote unit 102 to configure the remote unit 102. In various embodiments, the parameters may include information that indicates priority of certain random access procedures. In some embodiments, a random access procedure for transitioning from an inactive state (e.g., RRC_Inactive) to a connected state (e.g., RRC_Connected) may have priority over a random access procedure for on-demand system information ("SI") request. In certain embodiments, a random access procedure for a beam recovery request may have priority over a random access procedure for an uplink synchronization. As used herein, a first random access procedure having "priority over" a second random access procedure may mean that the first random access procedure has a higher priority than the second random access procedure and/or that the first random access procedure is performed before the second random access procedure.

In a second step, a new random access procedure may be triggered during a time in which a random access procedure is being performed.

In a third step, the remote unit 102 may perform a random access procedure. The random access procedure that is performed may be the new random access procedure triggered in the second step, the random access procedure being performed in the second step, or another triggered random access procedure. Specifically, the remote unit 102 selects one of multiple triggered random access procedures to perform based on the random access parameters related to priority received by the remote unit 102 in the first step. In one embodiment, the selected random access procedure may be a random access procedure having the highest priority. In response to the remote unit 102 selecting a random access procedure to perform, the remote unit 102 may stop performing any unselected random access procedures and perform the selected random access procedure.

In a fourth step, the remote unit 102 receives a random access response from the base unit 104 in response to the remote unit 102 transmitting a preamble corresponding to the selected random access procedure. In certain embodiments, in response to the random access response received in a beam including a backoff indicator, the backoff indicator may be applied only to the random access procedure associated with the beam (e.g., the selected random access procedure).

In a fifth step, in response to random access preamble identifiers included in the random access response matching the transmitted random access preamble, the remote unit 102 may transmit a message indicating that a corresponding resource is allocated by the random access response.

In a sixth step, the remote unit 102 may receive a response from the base unit 104 related to the message transmitted in the fifth step.

In some embodiments, performing multiple random access procedures may be performed by enabling multiple random access procedure to performed in parallel using various steps, such as the steps that follow, that may be performed in any suitable order and/or some steps may not be performed.

In a first step, a base unit 104 may transmit random access parameters to a remote unit 102 to configure the remote unit 102. In certain embodiments, the random access parameters may include a separate parameter set for different random access procedures.

In a second step, a new random access procedure may be triggered during a time in which a random access procedure is being performed.

In a third step, the remote unit 102 may perform a random access procedure. Specifically, the remote unit 102 may perform multiple random access procedures in parallel based on the separate parameter sets configured in the first step.

In a fourth step, the remote unit 102 may receive a random access response from the base unit 104 in response to the remote unit 102 transmitting a preamble corresponding to a random access procedure. In certain embodiments, in response to the random access response received in a beam including a backoff indicator, the backoff indicator may be applied only to the random access procedure associated with the beam.

In a fifth step, in response to random access preamble identifiers included in the random access response matching the transmitted random access preamble, the remote unit 102 may transmit a message indicating that a corresponding resource is allocated by the random access response. For example, in response to the remote unit 102 receiving a random access response for handover or reestablishment, the message may include an on-demand SI request.

In a sixth step, the remote unit 102 may receive a response from the base unit 104 related to the message transmitted in the fifth step.

Figure 4:
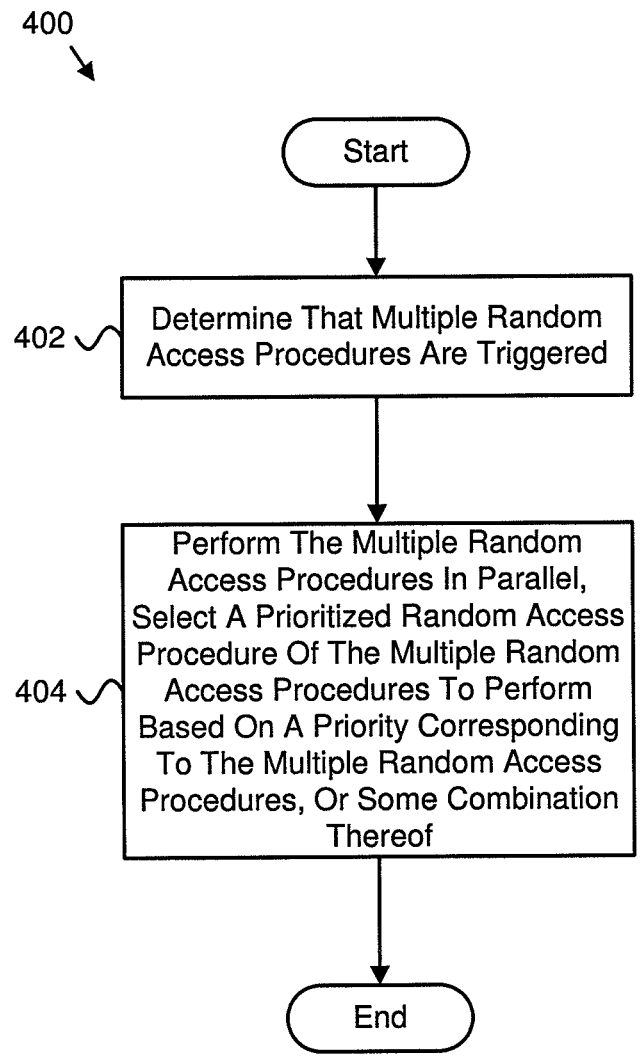
FIG. 4 is a schematic flow chart diagram illustrating one embodiment of a method for performing multiple random access procedures.

FIG. 4 is a schematic flow chart diagram illustrating one embodiment of a method 400 for performing multiple random access procedures. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include determining 402 that multiple random access procedures are triggered. As used herein, a random access procedure being "triggered" may mean that the random access procedure is initiated and/or started, such as in response to a threshold being reached and/or an event occurring. In some embodiments, the method 400 includes performing 404 the multiple random access procedures in parallel, selecting a prioritized random access procedure of the multiple random access procedures to perform based on a priority corresponding to the multiple random access procedures, or some combination thereof.

In one embodiment, a random access procedure for a transition from an inactive state to a connected state has priority over a random access procedure for an on-demand system information request. In a further embodiment, a random access procedure for a beam recovery request has priority over a random access procedure for an uplink synchronization. In certain embodiments, the method 400 includes selecting the prioritized random access procedure to perform based on a random access procedure for a transition from an inactive state to a connected state having priority over a random access procedure for an on-demand system information request, a random access procedure for a beam recovery request having priority over a random access procedure for an uplink synchronization, or some combination thereof. In various embodiments, the method 400 includes performing the prioritized random access procedure and stopping unselected random access procedures from being performed while the prioritized random access procedure is being performed. In some embodiments, the method 400 includes receiving a random access response in a beam. In such embodiments, the random access response includes a backoff indicator.

In certain embodiments, the backoff indicator is applied to a random access procedure associated with the beam. In some embodiments, in response to performing the multiple random access procedures in parallel, the method 400 includes assigning a separate parameter set for each random access procedure of the multiple random access procedures. In various embodiments, in response to performing the multiple random access procedures in parallel, the method 400 includes performing the multiple random access procedures in parallel based on the separate parameter set for each random access procedure.

In one embodiment, the method 400 includes receiving a random access response corresponding to a first random access procedure. In such an embodiment, in response to a random access preamble identifier included in the random access response matching a transmitted random access preamble, the method 400 includes transmitting a message including information corresponding to a second random access procedure. In certain embodiments, the method 400 includes receiving a random access response corresponding to a random access procedure. In such an embodiment, in response to receiving the random access response and in response to the random access procedure corresponding to a handover or reestablishment, the method 400 includes transmitting a message including an on-demand system information request.

Figure 5:
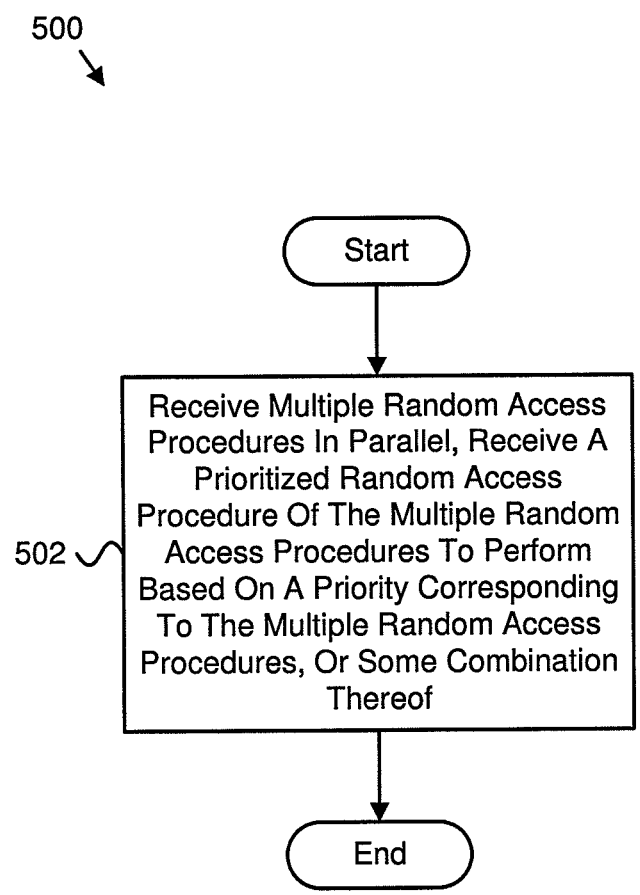
FIG. 5 is a schematic flow chart diagram illustrating another embodiment of a method for performing multiple random access procedures.

FIG. 5 is a schematic flow chart diagram illustrating another embodiment of a method 500 for performing multiple random access procedures. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include receiving 502 multiple random access preambles corresponding to multiple random access procedures in parallel, receiving a prioritized random access preamble of the multiple random access preambles based on a priority corresponding to the multiple random access procedures, or some combination thereof. As used herein, a "prioritized random access preamble" may refer to a random access preamble that corresponds to a random access procedure having a highest priority and/or a random access procedure that is selected by a remote unit 102 to be performed.

In certain embodiments, a random access procedure for a transition from an inactive state to a connected state has priority over a random access procedure for an on-demand system information request. In various embodiments, a random access procedure for a beam recovery request has priority over a random access procedure for an uplink synchronization. In some embodiments, the prioritized random access preamble is selected based on a random access procedure for a transition from an inactive state to a connected state having priority over a random access procedure for an on-demand system information request, a random access procedure for a beam recovery request having priority over a random access procedure for an uplink synchronization, or some combination thereof.

In certain embodiments, the method 500 includes transmitting a random access response corresponding to a first random access preamble. In some embodiments, in response to transmitting the random access response, the method 500 receives a message including information corresponding to a second random access preamble. In various embodiments, the method 500 includes transmitting a random access response corresponding to a random access preamble. In one embodiment, in response to transmitting the random access response and in response to the random access preamble corresponding to a handover or reestablishment, the method 500 includes receiving a message including an on-demand system information request.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a processer that:
   determines that a plurality of random access procedures is triggered; and
   performs the plurality of random access procedures in parallel, selects a prioritized random access procedure of the plurality of random access procedures to perform based on a priority corresponding to the plurality of random access procedures, or some combination thereof;
   wherein the processor is configured to select the prioritized random access procedure to perform at the apparatus based on a ranking order of each random access procedure in which a random access procedure initiated by the apparatus for a transition from an inactive state to a connected state has priority over a random access procedure initiated by the apparatus for a beam recovery request, or the random access procedure initiated by the apparatus for the beam recovery request has priority over a random access procedure initiated by the apparatus for an uplink synchronization.

2. The apparatus of claim 1, wherein the processor performs the prioritized random access procedure and stops unselected random access procedures from being performed while the prioritized random access procedure is being performed.

3. The apparatus of claim 1, further comprising a receiver that receives a random access response in a beam, wherein the random access response comprises a backoff indicator.

4. The apparatus of claim 3, wherein the backoff indicator is applied to a random access procedure associated with the beam.

5. The apparatus of claim 1, wherein, in response to performing the plurality of random access procedures in parallel, the processor assigns a separate parameter set for each random access procedure of the plurality of random access procedures.

6. The apparatus of claim 5, wherein, in response to performing the plurality of random access procedures in parallel, the processor performs the plurality of random access procedures in parallel based on the separate parameter set for each random access procedure.

7. The apparatus of claim 1, further comprising a receiver that receives a random access response corresponding to a first random access procedure and a transmitter, wherein, in response to a random access preamble identifier included in the random access response matching a transmitted random access preamble, the transmitter transmits a message including information corresponding to a second random access procedure.

8. The apparatus of claim 1, further comprising a receiver that receives a random access response corresponding to a random access procedure and a transmitter, wherein, in response to receiving the random access response and in response to the random access procedure corresponding to a handover or reestablishment, the transmitter transmits a message including an on-demand system information request.

9. A method of a user equipment, the method comprising:
determining, using a processor, that a plurality of random access procedures is triggered; and
performing, using the processor, the plurality of random access procedures in parallel, selecting a prioritized random access procedure of the plurality of random access procedures to perform based on a priority corresponding to the plurality of random access procedures, or some combination thereof, wherein the processor is configured to select the prioritized random access procedure to perform at the user equipment based on a ranking order of each random access procedure in which a random access procedure initiated by the user equipment for a transition from an inactive state to a connected state has priority over a random access procedure initiated by the user equipment for a beam recovery request, or the random access procedure initiated by the user equipment for the beam recover request has priority over a random access procedure initiated by the user equipment for an uplink synchronization.

10. An apparatus comprising:
a receiver that receives a plurality of random access preambles corresponding respectively to a plurality of random access procedures in parallel, receives a prioritized random access preamble of the plurality of random access preambles based on a priority corresponding to the plurality of random access procedures, or some combination thereof, wherein the prioritized random access preamble is selected based on a ranking order of each random access procedure in which a random access procedure initiated by a user equipment for a transition from an inactive state to a connected state has priority over a random access procedure initiated by the user equipment for a beam recovery request, or the random access procedure initiated by the user equipment for the beam recover request has priority over a random access procedure initiated by the user equipment for an uplink synchronization.

11. The apparatus of claim 10, further comprising a transmitter that transmits a random access response corresponding to a first random access preamble.

12. The apparatus of claim 11, wherein, in response to transmitting the random access response, the receiver receives a message including information corresponding to a second random access preamble.

13. The apparatus of claim 10, further comprising a transmitter that transmits a random access response corresponding to a random access preamble.

14. The apparatus of claim 13, wherein, in response to transmitting the random access response and in response to the random access preamble corresponding to a handover or reestablishment, the receiver receives a message including an on-demand system information request.

* * * * *